Figure 1:
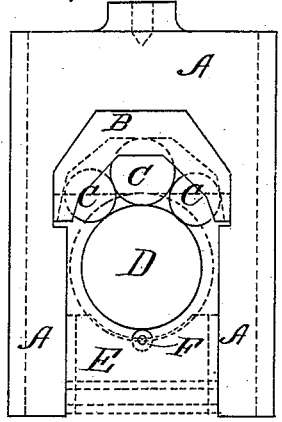
Figure 2:
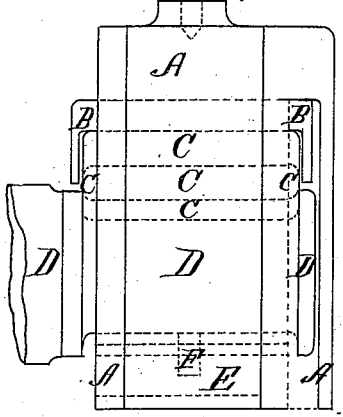
Figure 3:
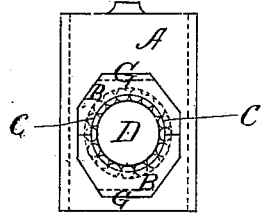
Figure 4:
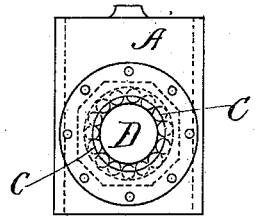
Figure 5:
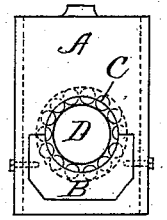
Figure 6:
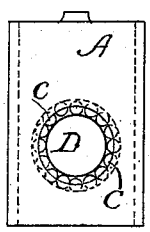
Figure 7:
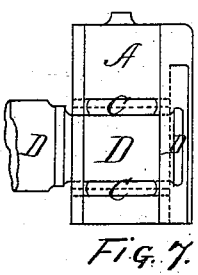
Figures 8, 9, 10, 11:
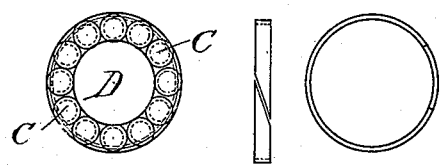
Figure 12:
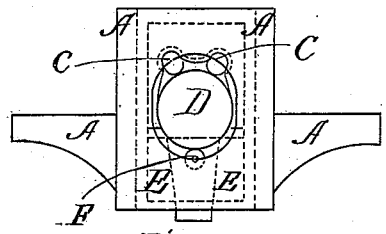
Figure 13:
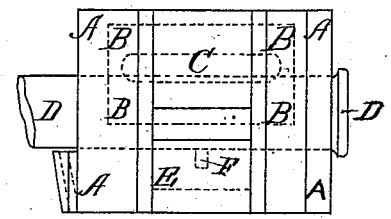
Figure 1:
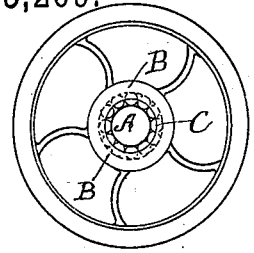
Figure 2:
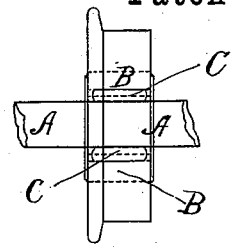
Figure 3:
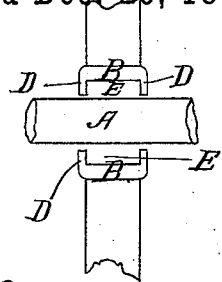
Figure 4:
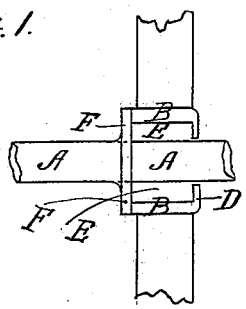
Figure 5:
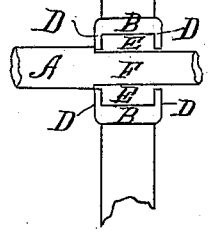
Figure 6:
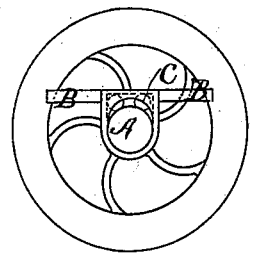
Figure 7:
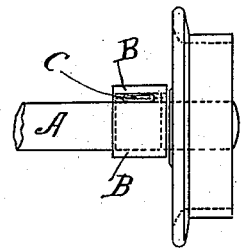
Figures 8, 9:
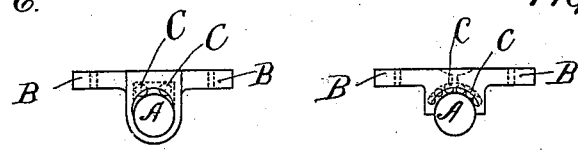
Figure 10:
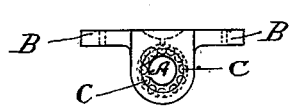
Figure 11:
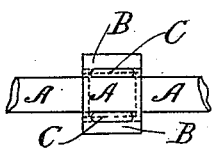
Figure 12:
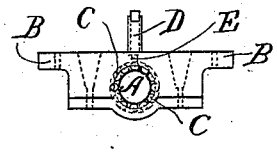

(No Model.) 3 Sheets—Sheet 1.

J. WILLIS.
BEARING FOR LOCOMOTIVE ENGINES.

No. 333,269. Patented Dec. 29, 1885.

WITNESSES
W<sup>m</sup> M<sup>c</sup> Gowan.
Percy K. Garlick.

INVENTOR
John Willis

N. PETERS. Photo-Lithographer, Washington, D. C.

(No Model.) 3 Sheets—Sheet 2.

J. WILLIS.
BEARING FOR LOCOMOTIVE ENGINES.

No. 333,269. Patented Dec. 29, 1885.

WITNESSES
W<sup>m</sup> M<sup>c</sup> Gavan
Percy K. Garlick

INVENTOR
J. M. Willis (No Model.) 3 Sheets—Sheet 3.
J. WILLIS.
BEARING FOR LOCOMOTIVE ENGINES.
No. 333,269. Patented Dec. 29, 1885.
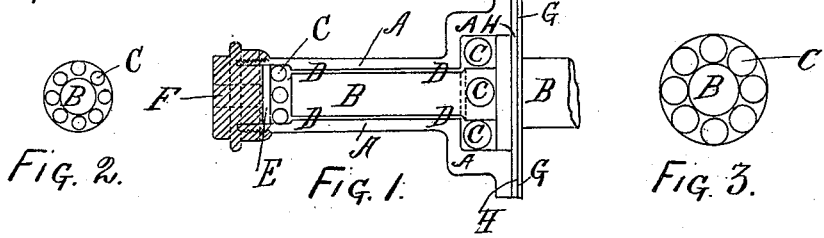
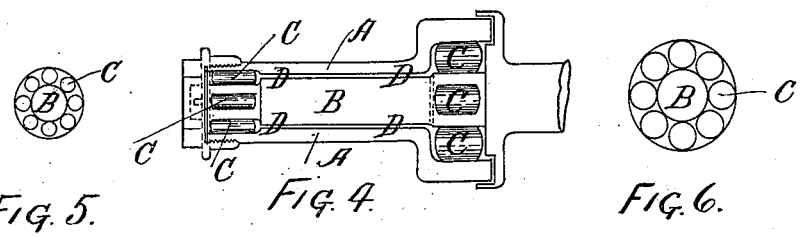
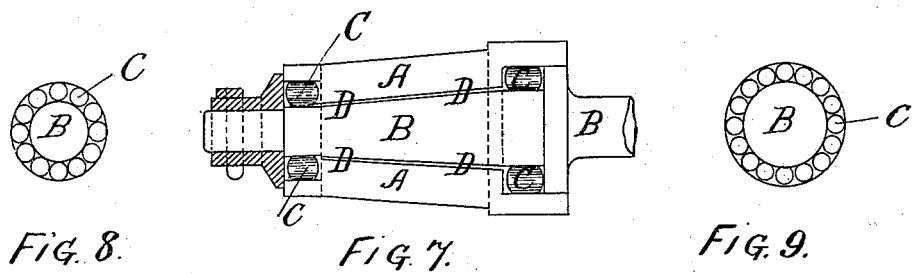
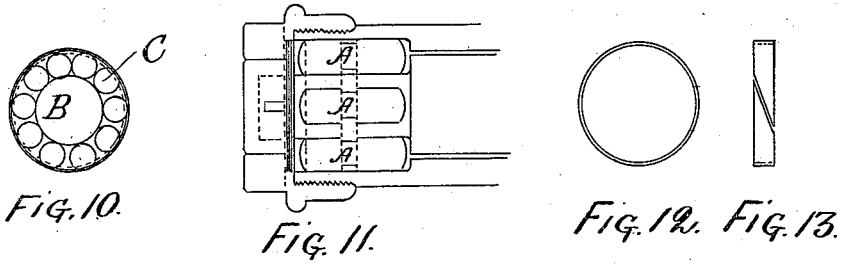
WITNESSES
W<sup>m</sup> M<sup>c</sup> Gowan
Percy K Garlick
INVENTOR
John Willis

UNITED STATES PATENT OFFICE.

JOHN WILLIS, OF SHEFFIELD, COUNTY OF YORK, ENGLAND.

BEARING FOR LOCOMOTIVE-ENGINES.

SPECIFICATION forming part of Letters Patent No. 333,269, dated December 29, 1885.

Application filed March 3, 1885. Serial No. 157,664. (No model.) Patented in England March 5, 1884, Nos. 4,401 and 7,186.

*To all whom it may concern:*

Be it known that I, JOHN WILLIS, of Specialty Steel Works, a citizen of England, residing at Sheffield, in the county of York, England, have invented new and useful Improvements in Bearings for Locomotive-Engines, Railway and Tramway Vehicles, and Carriages, Carts, and other Similar Road-Vehicles, (for which I have obtained Letters Patent in Great Britain, Nos. 4,401 and 7,186, dated March 5, 1884,) of which the following is a specification.

My invention relates to the application of the roller and ball bearing principle to locomotive-engines, railway and tramway vehicles, and carriages, carts, and other similar road-vehicles, in substitution for the ordinary rubbing-surfaces, and thereby to reduce friction.

For purposes of clearness, the manner in which my invention is to be performed in connection with engines, railway and tramway vehicles will be stated first.

In carrying this part of the invention into effect the axle-box of locomotive-engines, railway-vehicles, and tramway-cars, and the pedestal or the boss of tramway-corve wheels, are adapted, as hereinafter described, so as to allow of a combination with the same of a series or set of rollers or balls. By preference the rollers and balls may be made of soft-center steel hardened on the surface, or similar strong wear-resisting material. The rollers or balls shall bear either round the axle or on the upper part thereof.

In order to allow of a bearing which shall completely encircle the axle of locomotive-engines, railway-vehicles, and tramway-cars, it is proposed to adapt the axle-box in the following manner:

First. An axle-box may be cast which shall insure a bearing all round the axle.

Secondly. An axle-box may be cast with a bearing on the upper half of the axle. A step is fitted underneath which shall make the bearing continuous. This step may be secured to the axle-box by flanges, or by plates or washers, or by a pin or pins, bolts, slots, or other similar contrivance.

Thirdly. An axle-box may be cast with no bearing on the axle whatever. This bearing is supplied by fitting therein a step which shall insure a continuous bearing. The step may be secured as above mentioned.

Fourthly. An axle-box may be cast with no bearing on the axle whatever. This bearing is supplied by fitting therein two steps, and this will insure a continuous bearing. These steps may be secured as above mentioned.

In order to allow of a bearing on the upper part of the axle, it is proposed to adopt the axle-box of locomotive-engines, railway-vehicles, and tramway-cars in the following ways: First, an axle-box may be cast which shall insure a bearing on the upper part of the axle; secondly, an axle-box may be cast with no bearing whatever. This bearing is supplied by fitting into the upper part thereof a step to be secured in the manner above mentioned. The insides of the axle-boxes and steps are grooved, cored, or recessed to a depth sufficient to retain the said rollers or balls and admit of their projecting slightly beyond the recesses. These rollers or balls then form a rotating bearing upon the axle, where they bear continuously. They at the same time describe a circle round the axle. With regard to axle-boxes having the bearing in the upper part of the axle, the recesses within the same may be fluted, so as to contain individual rollers. The bearings of pedestals of tramway-corves are grooved, cored, or recessed, so as to insure the roller or ball bearing either all round the axle or on the upper part thereof. The bosses of tramway-corve wheels are grooved, cored, or recessed all round, so as to insure a continuous bearing on the axle. The recesses of the steps of the axle-boxes may be made of chilled or hardened faces to resist wear. Axle boxes, steps, pedestals, and bosses must be grooved, cored, or recessed, so as to leave a flange either on both sides or on one side, in order to secure and keep the rollers and balls in motion. Where a flange is left on only one side of an axle box, step, pedestal, and boss, the balls or the ends of the rollers left exposed on the other side may be retained in position by fitting thereon a plate or washer, which is secured by a pin or pins, bolts, slots, or other similar contrivance. Where rollers alone form a continuous bearing all round the axle, a groove or grooves may be cut round them, so as to receive a steel spring ring or rings, by which they may be encircled, thus avoiding too much play, which causes noise. The rollers may be in one length, or shorter sections may be a combination of rollers and balls or balls only.

Where the bearing of the axle box or step is only on the upper part of the axle, the axle may be lubricated by the following contrivance: At the sides of the lower end of the axle-box and underneath the axle a metal dish for oil is bolted or otherwise fastened, in which a small roller revolves on a spindle fixed on each side of the same. This roller revolves in contrast with the lower side of the axle, and thereby keeps the same and also the rollers and balls lubricated.

The pedestals of tramway-corves may be lubricated by the following method: Through the upper part of the pedestal a small hole is drilled, above which is fixed a tube to contain oil. The top of the tube is closed by a screw-cap. The oil drips from the tube through the small hole in the upper part of the pedestal, and thus feeds the rollers and balls.

The references to the drawings relating to each part of this invention will be given afterward.

I now proceed to state the manner in which my invention is to be performed in connection with carriages, carts, and similar road-vehicles.

In carrying this part of the invention into effect it is necessary that at each end of a bush there should be such a chamber or space as will suffice to contain a ring of the said rollers or balls, and which shall so bear upon the axle and bush as to leave the parts of the axle and bush between the enlarged ends of the bush completely clear.

The chamber or space at each end of the bush may be obtained by, first, enlarging the ends of the bush internally; or, secondly, by reducing those parts of the axle which are adjacent thereto; or, thirdly, by partly enlarging internally the ends of the bush, and partly by reducing those parts of the axle which are adjacent thereto. The axle in its bearing on the rollers or balls causes the same to revolve, and at the same time to describe a circle round the axle.

The rollers or balls may be secured in the ends of the bush by collars or plates fixed or fitted to or forming part of the axle, or fixed or fitted to the said bush.

By preference the bush is made of cast-steel instead of cast-iron, as now ordinarily made.

The size and number of the balls and rollers may be governed by the size of the end of the bush which contains them. By preference smaller rollers and balls are used for the cap end of the bush than for the other end. Rollers may be used alone, or balls may be used alone. A combination of rollers and balls may also be used. I prefer to make these rollers and balls of soft-center steel hardened on the surface, or similar strong wear-resisting material. With regard to rollers a groove may be cut round them, so as to receive a steel ring, which shall encircle the whole of them, thus avoiding too much play, which causes noise.

In the first and second sheets of the accompanying drawings (three sheets) the bearing of rollers has only been illustrated, the bearing of balls and of rollers and balls combined being the same. The third sheet contains instances of both the roller and ball bearing.

Sheet I shows the roller-bearing principle as applied to locomotive-engines, railway-vehicles, and tramway-cars.

Figs. I, (end view,) II, (side view,) III, IV, V, VI, and VII show the application to locomotive-engines and railway-vehicles.

Figs. I and II show axle-boxes A, with step B fitted into the upper part of same, and with rollers C secured by flange of step and bearing on upper part of axle D. E shows the metal dish for oil, and F is the small roller which lubricates the axle.

The letters of reference A, B, C, and D used in Figs. I and II apply to Figs. III, IV, V, VI, VII, XII, XIII.

Fig. III shows axle-box fitted with solid step with flange on one side only, and with bearing all round axle. The step and rollers are secured by a plate or washer secured or bolted to axle-box.

Fig. V shows axle-box with step fitted in lower part thereof, secured to same by bolts or screws, and with bearing all round axle. The rollers are secured by flanges of axle-box and step.

Figs. VI, end view, and VII, side view, show solid box-bearing all round axle, and with rollers secured by flanges of axle-box.

Fig. VIII is a roller grooved. This is an instance where the roller is grooved in two places.

Figs. IX and X are two views of a steel ring to encircle the ring of rollers, Fig. XI.

Figs. XII and XIII give the application to tram-cars. The application is the same as that to locomotive-engines and railway-vehicles. In this instance, however, the bearing is on the upper part of the axle, and the recesses within the axle box or step are fluted, and each fluted recess contains a roller.

Sheet II shows the roller-bearing principle as applied to tramway-corves.

Figs. I, II, III, IV, V show the application to the bosses of tramway-corve wheels. A is the axle. B is the boss; C, the rollers.

Figs. III, IV, V have additional letters of reference, and these are D, showing the flanges created by the recesses E.

Fig. IV shows a boss with a flange on one side, and has an additional letter of reference, and this is F, which shows a washer or collar on the other side thereof, which keeps the rollers in position.

Fig. V has an additional letter of reference, and this is F, which shows an axle reduced in diameter, thereby enlarging the space for rollers of a larger size.

Figs. VI, VII, VIII, IX, X, XI, and XII show the application to the pedestals of tramway-corves.

Fig. VI gives an end view of a pedestal fitted to a corve-wheel.

Fig. VII gives a side view.

Figs. VIII, IX, X give end views of pedestals with varying numbers of rollers.

Fig. XI gives a side view of Fig. X.

Throughout Figs. VI to XII, inclusive, A is the axle, B the pedestal, and C the rollers.

Fig. XII gives a pedestal with the addition of the lubricating-tube, which is marked D. E shows the drilled hole through the top of the pedestal.

Sheet III shows the bearing as applied to carriages, carts, and other similar road-vehicles.

Fig. I is a longitudinal section, and Figs. II and III transverse sections of the ball-bearing. A is the bush. B is an axle bearing on the balls C. D shows the length of the axle left clear by the bearings at each end of same. E is a plate or washer at the cap end of the bush, which confines the balls within the enlarged end of the bush A, which it adjoins. Through the center of this plate or washer the end of the axle passes, and is secured in the usual way within the cap F. The larger balls at the other end are confined by the collar of the axle B within the washers G and H.

Figs. IV, V, VI give the arrangement adapted to rollers, and Figs. VII, VIII, and IX give the arrangement adapted to carts and vehicles having taper axles, the letters of reference being the same as in Figs. I, II, III.

Figs. X, XI show a ring of rollers. Each is grooved round the middle, thus providing a continuous groove, A, around which a steel spring-ring, Figs. XII and XIII, is fitted.

Having now particularly described and ascertained the nature of my said invention and in what manner the same is to be performed, I declare that what I claim is—

1. A series of grooved anti-friction bearing-rollers, in combination with a steel spring-ring which fits into their grooves, substantially as set forth.

2. In combination with a journal and a series of anti-friction rollers or balls, C, in contact therewith, a lubricating-roll, F, also in contact with said journal, and an oil-receptacle, E, from which said roller supplies said journal, substantially as set forth.

3. In combination with a journal, a series of anti-friction bearing-rollers, each having two annular grooves near its ends, respectively, and bands which fit into said grooves for holding said rollers together, substantially as set forth.

In testimony whereof I have hereunto set my hand in the presence of two subscribing witnesses.

JOHN WILLIS.

Witnesses:
PERCY K. GARLICK,
WM. MCGOWAN.